US006994815B1

(12) United States Patent
Durack

(10) Patent No.: US 6,994,815 B1
(45) Date of Patent: Feb. 7, 2006

(54) METHOD AND APPARATUS FOR MOULDING PASTES AND SLURRIES

(75) Inventor: Michael James Durack, Queensland (AU)

(73) Assignee: Applied Technology and Planning Pty Ltd., Queensland (AU)

( * ) Notice: Subject to any disclaimer, the term of this patent is extended or adjusted under 35 U.S.C. 154(b) by 555 days.

(21) Appl. No.: 10/049,599

(22) PCT Filed: Aug. 14, 2000

(86) PCT No.: PCT/AU00/00968

§ 371 (c)(1), (2), (4) Date: Jun. 10, 2002

(87) PCT Pub. No.: WO01/12404

PCT Pub. Date: Feb. 22, 2001

(30) Foreign Application Priority Data

Aug. 13, 1999 (AU) .................................... PQ2196

(51) Int. Cl.
*B28B 1/26* (2006.01)
*B28B 7/36* (2006.01)
*B29C 33/46* (2006.01)

(52) U.S. Cl. ........................ 264/86; 264/109; 264/122; 264/87; 249/113; 249/141; 425/84; 425/812

(58) Field of Classification Search ........ 264/109–128, 264/86, 87; 52/596; 425/84, 812; 249/113, 249/141
See application file for complete search history.

(56) References Cited

U.S. PATENT DOCUMENTS 3,847,632 A 11/1974 Blengsli
4,770,793 A 9/1988 Treffry-Goatley et al.
5,700,409 A 12/1997 Corry

FOREIGN PATENT DOCUMENTS

EP 0396302 A 11/1990
EP 0 470 001 A1 2/1992
GB 2066139 A 7/1981
WO WO 98/42637 10/1998

*Primary Examiner*—Stephen J. Lechert, Jr.
(74) *Attorney, Agent, or Firm*—Workman Nydegger

(57) ABSTRACT

A high strength lightweight product formed from particulate inorganic materials such as a masonry building block is formed in a mould (1) from a flowable slurry of inorganic particularly materials and water. The interior of the mould is lined with perforate walls (2*a*, 3*a*, 4*a*, 3) fluidically coupled to a vacuum source (9). The fluid slurry contains entrained air and when pumped into the mound under superatmospheric pressure the gas bubbles contract in size. The fluidic mass is then subjected to subatmospheric pressure which enables the gas bubbles to expand the expel excess moisture from the mass.

20 Claims, 4 Drawing Sheets

METHOD AND APPARATUS FOR MOULDING PASTES AND SLURRIES

BACKGROUND OF THE INVENTION

This invention is concerned with improvements in moulding articles from pastes or slurries comprised predominantly of particulate inorganic materials with or without binders.

The invention is particularly although not exclusively concerned with the manufacture of high strength light weight masonry or ceramic articles and apparatus and methods for producing such apparatus.

Particulate inorganic compositions containing a cementitious binder or inorganic materials which react chemically to form a binding medium for the inorganic compositions are well known and include silica sands, portland cement, gypsum, lime, fly ash or other pozzolans, aluminosilicates, clays, and the like. These materials, which may or may not include polymeric organic binders for added strength or other organic materials such as cellulosic or polymeric fibres, are often used in the manufacture of building materials such as masonry blocks, wall panels and the like.

Other particulate inorganic compositions, typically clays and other ceramic materials can be moulded into shapes and fired to form high strength articles such as building bricks, pavers and the like.

In the case of masonry or ceramic articles, particulate materials are often packed into a mould as an aqueous slurry or flowable paste and then are dewatered to form a stiff "green" article able to be handled after removal from a mould for subsequent curing or firing.

It is well understood that mixtures of particulate materials and water or other liquid can be dried or dewatered using vacuum applied behind a filter membrane placed between the material to be so dried and the vacuum.

The process is normally used to extract the liquid from the solid so that either the solid or liquid is recovered for further processing or sale.

In the manufacture of masonry articles with a cementitious composition, a compromise must be made in determining the water content of such a composition.

To maximize the strength of the masonry article, only sufficient water to hydrate the cement powder or plasticize the mix should be added to the composition. Invariably this results in a relatively dry mixture which is difficult to mix thoroughly in a conventional mixer and this dry mixture is difficult to handle in a mould due to its stiff non-flowable nature.

While mixing and handling of cementitious compositions is assisted by adding an excess of water to produce a flowable paste or slurry, the strength of the resultant cured product may be substantially lessened by shrink cracking and the like.

Dewatering of concrete can remove water from concrete after placing in a mould so as to lower the water cement ratio which will normally have the effect of increasing the rate of set of the concrete and/or improving properties such as strength or water-tightness. Dewatering of concrete is carried out using either applied pressure directly, or indirectly by applying vacuum to the mass of concrete via simple perforated screen.

Typically, a concrete building panel can be dewatered in a horizontal mould having a perforated screen floor and a perforated screen mould top. A filter medium of paper or fabric is located between the upper and lower screens and the upper and lower faces of the panel.

After filling the mould with a flowable concrete slurry, a mechanical or hydraulic force is applied to the upper screen to force excess water out of the concrete mass to produce a moulded article stiff enough to remove from the mould.

Vacuum dewatering utilizes a similar mould structure encased in a flexible membrane enclosure. When the interior of the membrane enclosure is evacuated, atmospheric pressure applied to the upper screen surface via the membrane effects dewatering in a manner similar to the mechanical or hydraulic process described above.

Dewatering of clay materials can be very difficult due to their viscosity.

Dewatering systems operating in this manner are difficult to operate and can normally only produce simple flat or flat-sided components. As the water is drawn out of the article being dewatered the volume of the article will decrease. It is not possible to mould a three dimensional shape with accurate dimensions without using a mould that is designed to "shrink" while the dewatering or compacting process is underway. Usually however, in the case of moulded concrete articles, a slurry is introduced into an open topped mould and the mass is allowed to shrink within the mould, initially with the height of the article subsiding and subsequently the upright walls of the moulded article shrink away from the mould surface. Dewatering in this manner is very slow and would not normally be used in a high capacity production process.

It is an aim of this invention to provide an improved method and apparatus to rapidly dewater pastes or slurries of particulate inorganic materials in the production of moulded articles in such a way that the shape and/or volume of the article remains substantially the same throughout the dewatering process.

SUMMARY OF THE INVENTION

According to one aspect of the invention, there is provided a method of dewatering pastes or slurries of particulate inorganic materials in a mould, said method comprising the steps of:—

- filling a mould having one or more apertured walls with a flowable paste or slurry of particulate inorganic material; and,
- creating a pressure gradient between an inner region of said material in said mould and an outer region of said material in said mould whereby excess water is expressed from said material by a volumetric expansion within said material.

If required the volumetric expansion may be effected by a mechanical element in said mould.

Suitably, the mechanical element may comprise one or more expandable core members.

Alternatively the mechanical element may comprise one or more extendable projections associated with at least one inner face of said mould.

Preferably, the volumetric expansion is effected by gas bubbles in said cementitious material.

The material in the mould may be subjected to an initial dewatering stop by the application of mechanical pressure to an external surface of the moulded article.

The gas bubbles may be air entrained in a conventional mixing process.

Alternatively the gas bubbles may be chemically generated in the paste or slurry of particulate inorganic material.

If required the gas bubbles may be generated by vaporisation under subatmospheric pressure of an organic composition dispersed in said paste or slurry.

Suitably, said pressure gradient is effected by introducing said material into the interior of said mould under superatmospheric pressure and exposing the exterior of said mould to a pressure less than said superatmospheric pressure.

Suitably, said pressure less than said superatmospheric pressure is sub-atmospheric pressure.

If required said one or more apertured walls may comprise a screen member.

Preferably said screen member comprises a wedge wire sieve.

According to another aspect of the invention there is provided an apparatus for the manufacture of moulded particulate inorganic material, said apparatus comprising:— a hollow mould having one or more apertured walls;

an inlet port for the introduction of a flowable paste or slurry of particulate inorganic material; and, a pressure inducer to create, in use, a pressure gradient between an inner region of said material in said mould and an outer region of said material in said mould whereby excess water is expressed from said material by a volumetric expansion within said material.

If required said pressure inducer may comprise a mechanical element in said mould.

The mechanical element may comprise one or more extendable projections associated with at least one inner face of said mould.

Alternatively the mechanical element may comprise one or more expandable core members.

Said pressure inducer may comprise a pump to introduce gas containing particulate inorganic material into the interior of the said mould under superatmospheric pressure.

Said pressure inducer may include a vacuum source to form a subatmospheric pressure at the exterior of said mould.

If required, said one or more apertured walls may comprise a screen member.

Suitably, said screen member comprises a wedge wire sieve.

According to a further aspect of the invention there is provided a moulded cementitious article whenever produced according to the aforesaid method and/or whenever produced with the aforesaid apparatus.

THEORY OF OPERATION

While not wishing to be bound by any theory of the operation of the dewatering process according to the present invention it is believed that when pastes or slurries of particulate inorganic materials have been dewatered using the method according to the invention, the capillary channels between the fine particles are drawn down to a thickness, that is as small as they need to be to resist the vacuum pressure applied to them. If a paste or slurry is dewatered using external pressure by mechanical or atmospheric pressure, the material is simply compressed until the internal aggregates lock up and resist any further compaction. The capillaries thus largely remain "full" of water and not actually fully drained.

Slurries drained using vacuum or reduced pressure acting internally directly on the capillaries can exhibit tensile strengths, immediately after draining which are consistent with the presence of an internal binding force roughly equivalent to the vacuum pressure applied to drain it. This means that a slurry drained in this way, under a vacuum of around 50% atmosphere will exhibit a tensile strength of around 0.04 to 0.08 Mpa. Slurries drained using external pressure (even when much higher than 50% atmospheric pressure) will not exhibit such a high tensile strength.

The final properties of materials drained according to the invention are also improved as the thickness of the final capillary channels are more uniform and the remaining water is uniformly distributed throughout the mix.

By comparison with internal pressurisation, it is not possible to economically vacuum dewater cast slabs or articles evenly throughout as conventional "vacuum" dewatering relies on a mechanical pressure of atmosphere applicable to the top membrane. Compared with the dewatering process according to the invention, conventional vacuum dewatering processes can take up to 50 times as long to achieve.

According to the present invention, it is possible to de-water light weight slurries that contain flexible pockets of air or flexible aggregate without collapsing the material itself.

It is well understood that it is possible to entrain large quantities of air in pastes or slurries of particulate inorganic materials such as sand/cement/flyash mixtures. Quantities of air as high as 80% are possible.

These mixtures, when in their wet state are highly fluid, and are impossible to shape unless they are cast into moulds and are allowed to set over a period of several hours. Any attempt to use pressure or vibration will simply collapse the moulded shapes due to inherent thixatropic properties of the mixture and so the "normal" brick or block making techniques employed for dense concrete are unsuitable as are the normal "pressure" or "press" type vacuum moulding techniques.

There are techniques that employ wire cutting of partly set aerated concrete to produce solid modular blocks in an industrialized manner but there are no aerated concrete or clay products that have been made in a rapid moulding process. This makes it very difficult to produce hollow light weight blocks from aerated concrete and the inventor is unaware of any products made of aerated light weight concrete that are hollow. This method is also unsuitable for use with large particles or fibres of either mineral or organic origin. It is generally only employed using maximum particle sizes of around 1 mm.

BRIEF DESCRIPTION OF THE DRAWINGS

In order that the various aspects of the invention may be more fully understood and put into practical effect, preferred embodiments will now be described with reference to the accompanying drawings in which:—

Figure 1:
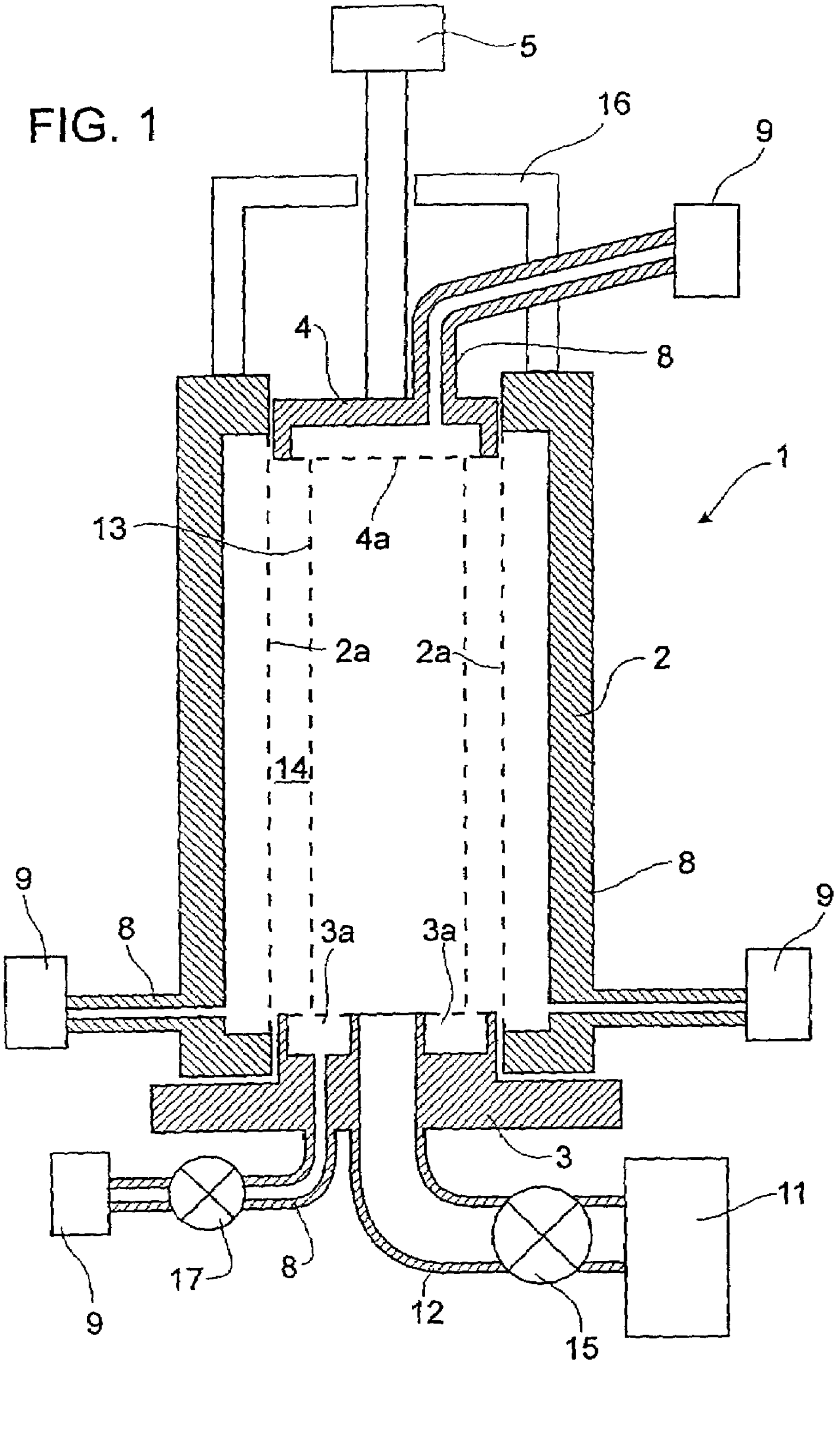
FIG. 1 shows schematically a moulding apparatus according to the invention.

When aerated light weight concrete is placed in a sieve lined mould it is possible to de-water the concrete in a way that does not remove all of the entrained air and will leave the concrete stiff enough to de-mould after a short period of time.

It is advantageous to pump the light weight concrete into the mould under pressure as this results in greater dimensional accuracy and gives the ability to control the product density to a greater extent.

A typical mould arrangement for the making of a 190 mm×190 mm×390 mm hollow masonry block consists of:

A sieve lined box 190×190×390 having a sieve lined lid.

+A pair of sieve lined core formers approximately 190×130×140 attached to a base on the lid but including an aperture through which concrete can be injected under pressure.

The box and lid is arranged to fit over the base and to be able to be raised and lowered on guides arranged on either side. The lid can be held in place under a force provided by a hydraulic ram mounted on a frame over the top.

Each facet of the mould is coupled to a vacuum source.

The sieve liners are typically wedge wire screens with an aperture of less than 200 microns.

The base is provided with a valve which can be opened to allow the passage of concrete into the mould cavity via the aperture in the base. The valve can be closed once the mould is full.

The valve is connected to a supply of concrete at pressure.

In operation the procedure is follows:

The mould is closed using the hydraulic ram.

The valve in the base is opened allowing concrete to fill the mould.

The concrete fills the mould and as the pumping continues the entrained air is reduced in volume as the pressure builds up in the mould and more material can enter the mould.

Water starts to leave the material being forced out by the internal air pressure.

As the water leaves, the entrained air bubbles expand and compensate for the loss in volume caused by the departing water.

The concrete is allowed to "drain" under the pressure of the compressed air bubbles within the aerated concrete for 1 to 2 seconds. Water starts to drain out of the material near the sieve faces and into the cavities behind the screens.

The vacuum is applied to the lid, base, outer wall and then inner core, for around 5 to 15 seconds. More water drains out of the material, and the entrained air can expand further to compensate for the lost volume. As it approaches a "dry" state the larger bubbles are the first to "leak" in this way as the internal pressure within them is higher than that present in the small bubbles. Ultimately only small bubbles remain. It is the initial proportion of small bubbles that appears to control the final density.

The vacuum within the core is turned off. This causes a slight shrinking back of the material near the core, as the space within the mould returns to atmospheric pressure.

The box and lid is raised to a point slightly above the height of the moulded block.

A "pallet" is inserted in under the raised block and the vacuum on the walls and finally the lid is turned off.

The block drops out of the mould, the mould is raised 200 mm and the block is removed.

DETAILED DESCRIPTION OF DRAWINGS

FIG. 1 represents the abovementioned arrangement in schematic form and schematically illustrates one method.

In FIG. 1 the moulding apparatus 1 comprises a main body supported detachably on a base 3 and includes a top closure member 4 attached to a fluid powered ram 5.

Each of main body 2, base 3 and closure member 4 has an inner mould surface formed by wedge wire sieves 2*a*, 3*a* and 4*a* respectively.

Located between wedge wire sieves 2*a*, 3*a* and 4*a* and respective mould elements 2, 3 and 4 are hollow cavities 7, each coupled by respective conduits 8 to a source of reduced air pressure such as a vacuum pump 9.

Located in base 3 is an injection port 10 fluidically connected to a source 11 of fluid cementitious mortar under pressure via conduit 12.

Additional wedge wire sieves 13 attached to closure member 4 form rectangular core formers within the mould cavity 14 defined by the wedge wire sieves 2*a*, 3*a*, 4*a* and 13. Typically the mould cavity takes the shape of a conventional rectangular masonry building block having a central web separating rectangular apertures passing between the top and bottom of the block.

In use, with the mould in a closed position as shown, a flowable slurry of cement, fly ash and water is pumped into the mould cavity under pressure. The slurry could comprise portland cement, siliceous sand, fly ash or other pozzolan, aluminosilicate clays, lime, gypsum or like inorganic materials in any suitable combination and optionally with the addition of wood or cellulose fibres and/or particulate industrial or domestic waste materials. The flowable slurry also includes entrained air formed by high speed mixing of an air entraining surfactant to form a froth which is then stirred into the cementitious slurry. The formation of surfactant froths for air entrainment in cementitious materials is ell known and forms no part of the invention.

When the mould cavity is full of cementitious slurry, the pressure within the mould cavity is allowed to normalise to that of the pressurised slurry 15 source 11 before closing valve.

Initially the mechanical pressure applied by source 11 physically expresses some water from the slurry via sieves 2*a*, 3*a*, 4*a* and 13 and, if required, additional mechanical pressure may be applied by fluid powered ram 5 acting on closure member 4. as the pressure within the mould cavity 14 is greater than atmospheric pressure, the air bubbles entrained in the slurry are of a educed size due to the superatmospheric pressure.

With valve 15 closed, a vacuum is applied to the interior of mould 1 via conduits 8 coupled to vacuum pump 9 whereupon the entrained ai bubbles throughout the fluid slurry increase in volume thus giving rise to an "internal" pressurisation of the slurry whereby water is expressed relatively evenly from the material in the mould.

Initially, the excess water in the slurry coats the inorganic particles and forms a lubricant which permits a relatively free flowing slurry. In addition, a substantial amount of water is captured by the air bubbles which due to surface tension effects forms fairly stable wall of water around each bubble.

The expression of water from the slurry under the conditions described is quite substantial with the internally expanding air bubbles expanding to occupy the spaces previously occupied by water which follows fine capillary paths to the sieve walls.

As the water is expressed from the slurry it rapidly stiffens and after about 5–10 seconds application of vacuum pressure to the mould interior, water flow from the sieve walls is found to have ceased leaving a very stiff "green" block which is easily handled.

The vacuum pressure to base 3 is isolated by closing valve 17 and thereafter by means of bracket 16, the mould containing the formed, dewatered block to elevated to allow a platen to be inserted between the base 3 and the remainder of the mould. The respective sources of the vacuum pressure for body 2 and closure member 4 are isolated and ram 5 is actuated to eject the block onto the platen.

The block making cycle can then be repeated.

Figure 2:
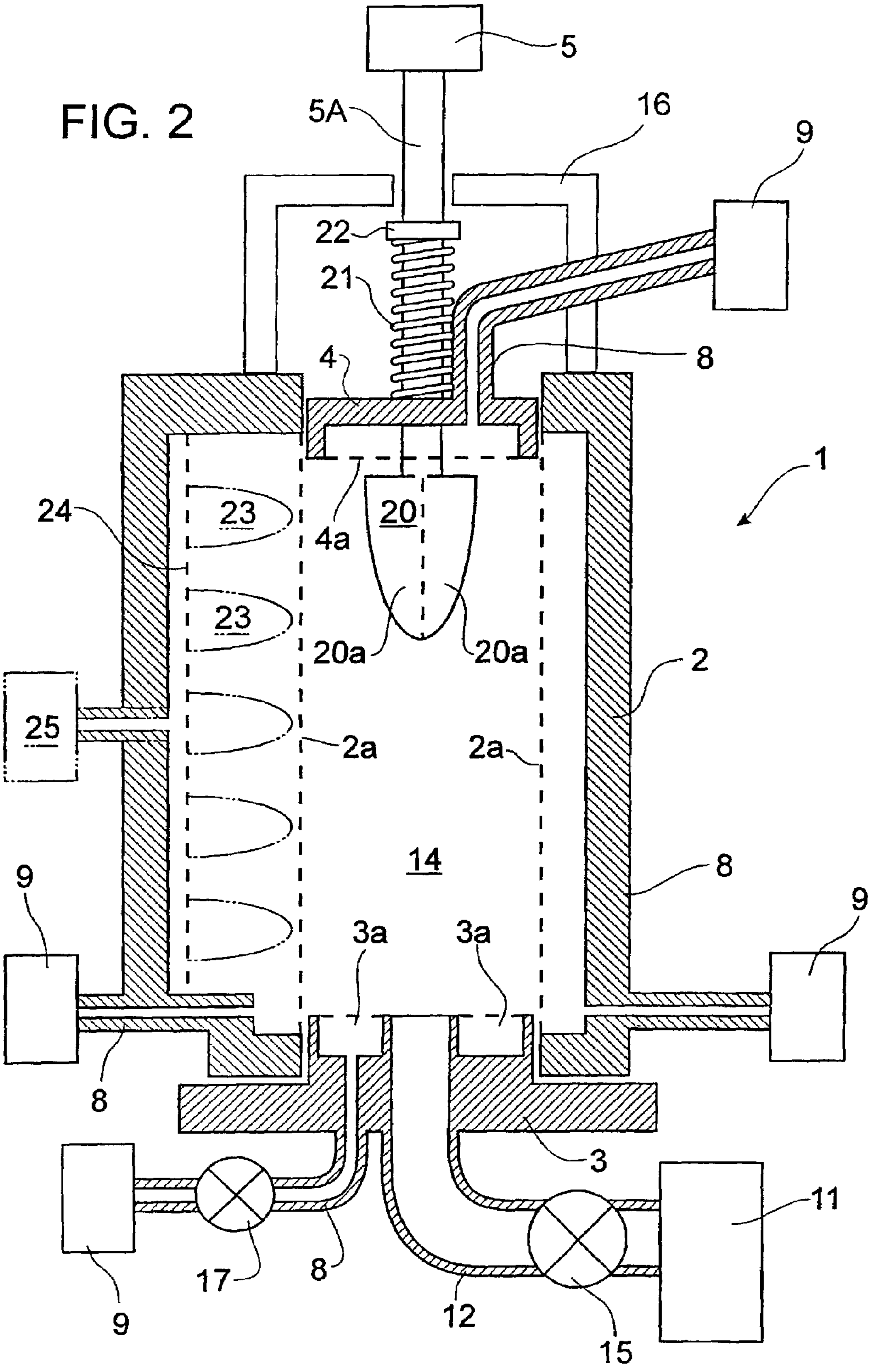
FIG. 2 shows schematically modified forms of the apparatus of FIG. 1.

FIG. 2 illustrates schematically alternative embodiments of the invention and in this drawing, like reference numerals are employed for like features for the sake of simplicity.

Even where "normal" density products are required to be moulded it is considered that a reasonable quantity of air is still entrained during the mixing of the dry powders with water and thus even without the addition of froth to the mix there will still occur some internal expansion of air bubbles to assist in expression of water from the moulded article.

Internal expansion can be effected mechanically by driving a void forming core 20 into the mass of slurry in the mould cavity either during the initial pressurisation stage or the subsequent vacuum stage or both.

Conveniently core 20 is mounted retractably on the piston shaft 5*a* or ram 5 and allows telescopic movement relative to closure member 4 by means of a spring 21 and collar 22 to retain the spring. Core 20 may be formed with mechanically expandable core elements 20*a* actuable under pressure from ram 5 to cause elements 20*a* to move apart to enhance the internal pressurisation effect. If required the void forming core 20 may include an apertured surface 20*a* also coupled to the vacuum pump 9 by a conduit inside ram shaft 5*a*.

Alternatively, as shown in phantom, a series of thin knife like projections 23 mounted on a plate 24 are insertable via aligned apertures in sieve wall 2*a* into the interior of the mass of cementitious material by means of fluid powered ram 25.

The alternative embodiments of FIG. 2 are suited to solid components such as building blocks, pavers or the like where the core apertures extend into the block from one or two faces only.

In yet another embodiment, the slurry may include chemical compounds adapted to chemically generate gas bubbles in the slurry. An example of this may be the inclusion of aluminium powder which reacts with an alkali to produce fine bubbles of hydrogen gas.

Figure 3:
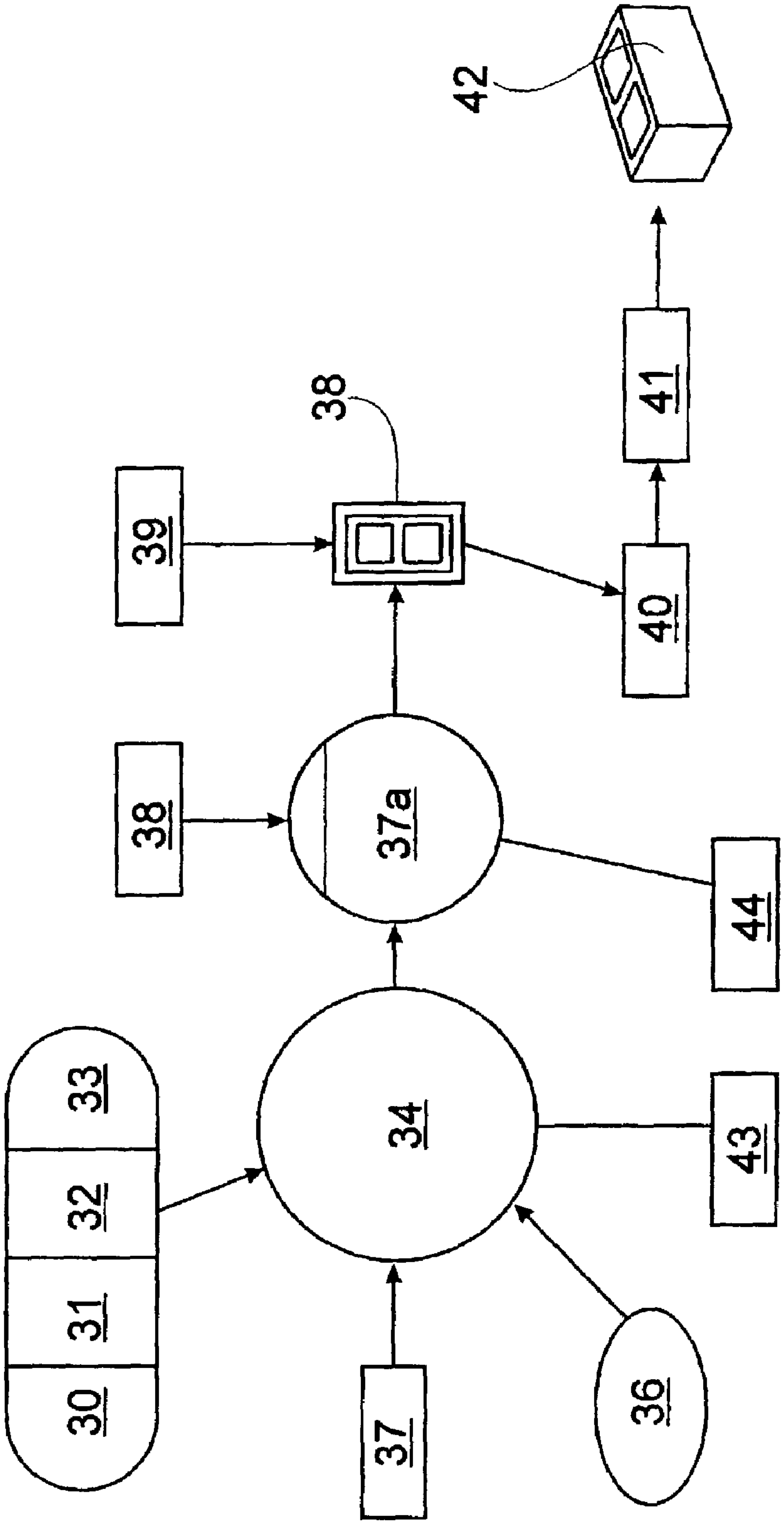
FIG. 3 shows schematically the process of preparation and moulding of a cementitious slurry according to the invention.

FIG. 3 shows schematically the moulding process according to the invention.

In FIG. 3, a cementitious binder such as portland cement 30, fly ash 31, gypsum 32, hydrated lime 33 or the like or mixtures thereof are metered into a suitable mixer 34 such as a paddle mixer or the like. To the mixer are also added water from reservoir 35 and a surfactant froth from high speed mixer 36.

The components of the slurry are gently mixed together to avoid destruction and/or coagulation of the surfactant froth and the mix is then passed to a pressurisation chamber 37 coupled to a compressor 38 which pressurises the mix in the range of from about 0.5 bar about 5 bar. The mix is gently agitated by a paddle or the like within chamber 37*a* to maintain fluid mobility in the mix while the entrained gas bubbles are subjected to volumetric contraction under pressure.

The pressurised slurry is then conveyed under pressure to block mould 38 coupled to vacuum pump 39 operating at a pressure in the range of from 0.4 bar to 0.1 bar. Moulded blocks are accumulated in a palletising region 40 before transfer to an autoclave 41 where the blocks are autoclaved in a saturated steam environment at a temperature of from about 150° C. to 200° C. for up to 8 hours to produce masonry blocks 42. Alternatively the blocks may be cured in air at ambient or elevated temperatures.

Typically, the masonry blocks, building panels or other structural nd/or decorative materials able to be produced according to the invention will contain 75% fly ash and 25% portland cement and can be produced with mould cycle times as low as 10 seconds. For building products such as masonry blocks and building panels, a cellulosic fibre such as wood meal, wood flour or like material or synthetic fibrous materials may be added to improve the toughness of the material and enhance fastener retention. Products according to the invention have a much smoother surface finish than conventional masonry blocks, are able to be sanded or ground readily and easily accept masonry nails and other fasteners.

In a variation of the process described in FIG. 3, an organic liquid composition, miscible, immiscible or soluble in water and having a boiling point at standard temperature and pressure less than that of water may be added to he mix.

A liquid compound having a boiling point greater than ambient pressure and temperature conditions may be added to mixer 34 from container 43. Such a compound may be for example a $C_2$–$C_6$ alcohol such as ethyl alcohol, isopropanal. If the compound selected boils at temperature and pressure conditions less than ambient, such a compound may be added to pressurising chamber 37 from a pressurised container 44. Suitable compounds may include propane, butane or mixtures thereof or say, dimethyl ether. Preferably such low boiling liquids are however, non-toxic, environmentally acceptable and nonflammable.

By incorporating such a low boiling liquid compound into the liquid slurry, the internal expansion which occurs in the mould under vacuum may be greatly enhanced to achieve greater dewatering and/or lower density in the resultant moulded product. The low boiling point liquid may be used alone or in combination with a surfactant froth.

Figure 4:
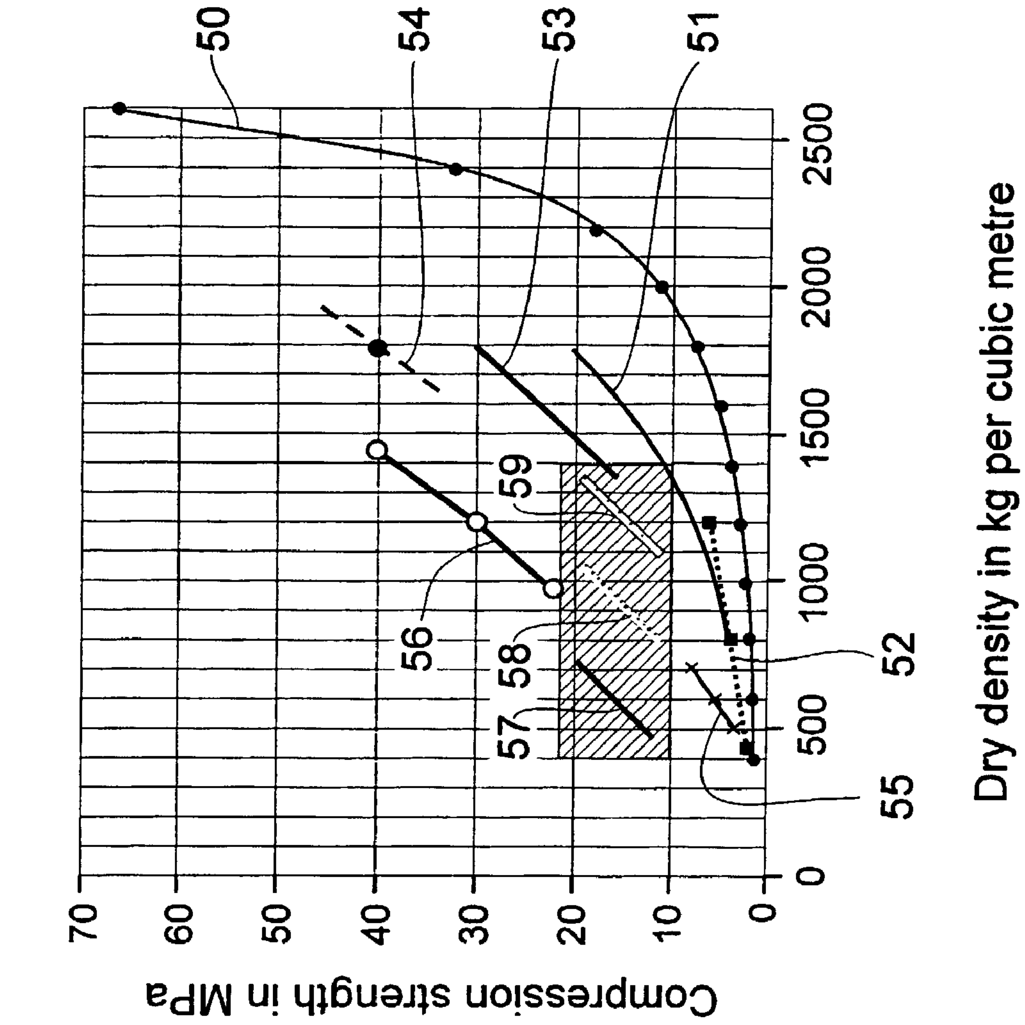
FIG. 4 shows comparative graphical representations of compressive strength vs dry density of cementitious building materials.

FIG. 4 shows a graphical comparison of compressive strength vs dry density of common cementitious materials and the composition according to the invention. In the graph:—

- curve 50 represents a conventional sand/aggregate mix;
- curve 51 represents concrete with foamed polystyrene aggregate;
- curve 52 represents a foamed sand/cement composition;
- curve 53 represents a concrete with a light weight clay aggregate;
- curve 54 represents fired clay;
- curve 55 represents autoclaved chemcially aerated concrete;
- curve 56 represents lightweight cementitious materials according to the invention.

It readily can be seen that according to the invention provide a substantial density reduction whilst maintaining good compressive strengths. This weight:strength advantage gives rise to reduced building construction costs in reduced transportation charges and reduced fatigue and injury in blocklayers resulting in greater productivity.

Curves 57, 58 and 59 respectively show a direct comparison of compressive strength vs dry density of moulded masonry blocks (of the type shown at 42 in FIG. 3) for cementitious composition according to the invention, concrete with a light weight clay aggregate and a conventional concrete block. Clearly, for a substantially identical compressive strength range, there are substantial weight reductions available with products according to the invention.

Other comparisons with conventional masonry building blocks shown a fire resistance rating which is the same or better, a sound transmission classification which is about the same or slightly less than conventional blocks and a thermal resistance which is up to twice the rating of convention blocks.

For example, other configurations of the moulds can be employed to produce decorative cementitious articles and structural elements including but not limited to—larger blocks, solid blocks, panels, and completely hollow blocks.

It is also possible to modify the apparatus according to the invention to continuously extrude concrete sections either on flat or on edge, with or without longitudinal apertures.

Many combinations of both sieve lined cores and non sieve lined (plain) cores can be arranged for specific requirements. Internal bubbles or voids, can be caused to be created within the products during vacuum de-watering, by introducing perforated pins into the centre of the wet concrete. These pins are connected to valves that can be alternately connected to vacuum, or atmosphere, or pressure and will allow small bubbles to develop within the material while it is being vacuumed so as to maintain dimensional accuracy of the outer surface.

It should be noted, that the releasing of the block or other product from the mould after completion of the de-watering process, is achieved because three things happen simultaneously.

When the material has "dried" the capillaries between particles have drawn the material below the upper faces of the larger surface particles and there is no longer any large contact of water with the surface of the wedge wire. There can no longer be any suction of any smooth surface with the body of concrete.

The wedge wire screen allows the material to breathe so that "suction" is further reduced.

The breathing ability of the wire screen allows the concrete to "shrink" slightly off the face of the wire causing a gap to develop between the material and the wire allowing for almost frictionless release of the product.

It is also possible to arrange the releasing sequence, so that the shrinking is reduced to such a level, that the material is still in contact with the sieves. The releasing can then be achieved by washing the back of the screen with water so as to cause a slipper slurry to develop on the interface, and so release the block.

If slurries without entrained air are pumped into this type of mould arrangement a similar de-watering process will occur with the loss in volume caused by the departing water compensated by the entry of fresh "mobile" material. If no air is present it is not possible to fully drain the moulded material as the water will not leave if there is nothing left to replace it no matter what vacuum is applied.

In practice it is very difficult to make slurry mixes without entraining air and so it would appear to work without any special effort to include air. This is because the process will work with very small quantities of air present.

It must be remembered that if a slurry is pumped into the mould at 2 atmospheres and contains as little as 20 liters per cubic meter of entrained air, at this pressure, when the vacuum is applied down to 25% atmospheric pressure, this air will increase to around 160 liters in volume. Typically the removal of 50 to 100 liters of water from a "mobile" concrete mix will cause it to stiffen to a very firm state.

Products containing cement and fly ash according to the invention attain surprisingly high strengths, particularly for light weight concrete products because of what is considered to be an internal microcompaction of the cement and fly ash particles as the excess water is urged to depart the mass under the influence of "internal" pressurisation of air or gas bubbles expanding within the mass. The resultant structure is a densely compacted matrix of solid materials with microscopic bubble cavities interconnected by microscopic capilliaries through which the excess water is able to escape the cementitious mass.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

What is claimed is:

1. A method of dewatering pastes or slurries of particulate inorganic materials in a mould, said method comprising the steps of:

filling a mould having one or more apertured walls with a flowable paste or slurry of particulate inorganic material; and, creating a pressure gradient between an inner region of said material in said mould and an outer region of said material in said mould whereby excess water is expressed from said material by an internal expansion within said material and wherein external dimensions of an article so moulded remain substantially unchanged during dewatering.

2. A method as claimed in claim 1 wherein internal expansion is effected by a mechanical element in said mould.

3. A method as claimed in claim 2 wherein the mechanical element comprises one or more expandable core members.

4. A method as claimed in claim 2 wherein the mechanical element comprises one or more extendable projections associated with at least one inner face of said mould.

5. A method as claimed in claim 1 wherein internal expansion is effected by expansion of gas bubbles in said cementitious material.

6. A method as claimed in claim 5 wherein said gas bubbles comprise air entrained in a conventional mixing process.

7. A method as claimed in claim 5 wherein said gas bubbles are chemically generated in the paste or slurry.

8. A method as claimed in claim 5 wherein said gas bubbles are introduced into said paste or slurry as a frothed liquid.

9. A method as claimed in claim 5 wherein said gas bubbles are generated by vaporisation under subatmospheric conditions of an organic composition dispersed in said material.

10. A method as claimed in claim 1 wherein said pressure gradient is effected by introducing said material into the interior of said mould under superatmospheric pressure and exposing the exterior of said mould to a pressure less than said superatmospheric pressure.

11. A method as claimed in claim 10 wherein said pressure less than said superatmospheric pressure is sub-atmospheric pressure.

12. A method as claimed in claim 5 wherein material in the mould is subjected to an initial dewatering step by the application of mechanical pressure to an external surface of the moulded article.

13. An apparatus for manufacture of moulded particulate inorganic materials, said apparatus comprising:

a hollow mould having one or more apertured walls;

an inlet port for the introduction of a flowable paste or slurry of particulate inorganic material; and, a pressure inducer to create, in use, a pressure gradient between an inner region of said material in said mould and an outer region of said material in said mould whereby excess water is expressed from said material an internal expansion within said material.

14. An apparatus as claimed in claim 13 wherein said pressure inducer comprises a mechanical element in said moult mould.

15. An apparatus as claimed in claim 14 wherein the mechanical element comprises one or more extendable projections associated with at least one inner face of said mould.

16. An apparatus as claimed in claim 14 wherein the mechanical element comprises one or more expandable core members.

17. An apparatus as claimed in claim 13 wherein said pressure inducer comprises a pump to introduce particulate inorganic material containing gas into the interior of said mould under superatmospheric pressure.

18. An apparatus as claimed in claim 13 wherein said pressure inducer includes a vacuum source to form a sub-atmospheric pressure at the exterior of said mould.

19. An apparatus as claimed in claim 13 wherein said one or more apertured walls comprises a screen member.

20. An apparatus as claimed in claim 19 wherein said screen member comprises a wedge wire sieve.

* * * * *

UNITED STATES PATENT AND TRADEMARK OFFICE

CERTIFICATE OF CORRECTION

PATENT NO. : 6,994,815 B1
APPLICATION NO. : 10/049599
DATED : February 7, 2006
INVENTOR(S) : Michael James Durack It is certified that error appears in the above-identified patent and that said Letters Patent is hereby corrected as shown below:

Title Page
Item 57, ABSTRACT, line 10, change “the expel” to --and expel--

Column 2
Line 49, after “If required” insert --,--
Line 53, after “Alternatively” insert --,--
Line 63, after “Alternatively” insert --,--
Line 65, after “If required” insert --,--

Column 3
Line 7, after “If required” insert --,--
Line 22, after “If required” insert --,--
Line 27, after “Alternatively” insert --,--
Line 49, after “invention” insert --,--
Line 62, after “strengths” remove “,”

Column 4
Line 25, after “highly fluid” remove “,”
Line 36, after “manner” insert --,--
Line 39, after “concrete” insert --,--

Column 5
Line 8, change “+A” to --A--

Column 6
Line 8, remove “7”
Line 11, remove “10”
Line 32, change “ell” to --well--
Line 36, remove “15”
Line 37, change “valve.” to --valve 15.--
Line 42, change “as the pressure” to --As the pressure--
Line 47, change “pump” to --pumps--
Line 48, change “ai” to --air--

UNITED STATES PATENT AND TRADEMARK OFFICE

CERTIFICATE OF CORRECTION

PATENT NO. : 6,994,815 B1
APPLICATION NO. : 10/049599
DATED : February 7, 2006
INVENTOR(S) : Michael James Durack It is certified that error appears in the above-identified patent and that said Letters Patent is hereby corrected as shown below:

Column 7
Line 3, change "to elevated" to --is elevated--
Line 10, change "invention and in this drawing," to --invention, and in this drawing--
Line 28, after "If required" insert --,--
Line 52, change "35" to --37--
Lines 55 and 56, change "froth and the" to --froth. The--
Line 56, change "37" to --37a--

Column 8
Line 6, change "nd/or" to --and/or--
Line 21, change "he" to --the--
Line 25, change "isopropanal" to --isopropanol--
Line 28, change "37" to --37a--

Column 9
Line 44, change "slipper" to --slippery--

Column 11
Line 8, remove "moult"

Signed and Sealed this

Tenth Day of October, 2006

JON W. DUDAS
*Director of the United States Patent and Trademark Office*